United States Patent [19]

Glezer et al.

[11] Patent Number: 5,142,859
[45] Date of Patent: Sep. 1, 1992

[54] TURBINE COOLING SYSTEM

[75] Inventors: Boris Glezer, Del Mar; David M. Evans, Chula Vista, both of Calif.

[73] Assignee: Solar Turbines, Incorporated, San Diego, Calif.

[21] Appl. No.: 658,830

[22] Filed: Feb. 22, 1991

[51] Int. Cl.[5] ............................. F02C 3/00; F02C 5/00
[52] U.S. Cl. .................................. 60/39.75; 415/115; 415/116
[58] Field of Search ............... 60/39.75; 415/115, 116

[56] References Cited

U.S. PATENT DOCUMENTS

| | | | |
|---|---|---|---|
| 3,034,298 | 5/1962 | White | 60/39.66 |
| 3,433,015 | 3/1969 | Sneeden | 415/116 |
| 3,670,497 | 6/1972 | Sheldon | 415/116 |
| 3,989,410 | 11/1976 | Ferrari | 415/115 |
| 4,173,120 | 11/1979 | Grosjean et al. | 60/39.16 R |
| 4,668,162 | 5/1987 | Cederwall et al. | 415/115 |
| 4,889,469 | 12/1989 | Wilkinson | 415/116 |

FOREIGN PATENT DOCUMENTS

| | | |
|---|---|---|
| 1381277 | 1/1975 | United Kingdom . |
| 1438375 | 6/1976 | United Kingdom . |
| 2018362 | 10/1979 | United Kingdom . |
| 2111598 | 7/1983 | United Kingdom . |
| 2170867 | 8/1986 | United Kingdom . |

Primary Examiner—Richard A. Bertsch
Assistant Examiner—Howard R. Richman
Attorney, Agent, or Firm—Larry G. Cain

[57] ABSTRACT

Cooling air delivery systems for gas turbine engines are used to increase component life and increase power and efficiencies. The present system increases the component life and increases efficiencies by better utilizing the cooling air bled from the compressor section of the gas turbine engine. For example, a first flow of cooling air is directed to the nozzle and shroud assembly and another portion of the first flow is exited from the nozzle plenum into an annular reservoir to improve cooling of a rotor assembly and to at least reduce ingestion of hot power gases into the internal portion of the engine. The system further includes a second flow of cooling air which is directed through internal passages of the engine and into the annular reservoir and is used to cool the rotor assembly and to at least reduce ingestion of hot power gases into the internal portion of the gas turbine engine. To insure that the least amount of hot power gas is ingested into the internal portion of the engine is minimized a radial blade flange arrangement and a radial shroud flange arrangement axially overlap each other in a preestablished radially spaced proximity forming a buffering zone therebetween into which the mixed cooling air in the annular reservoir is directed. Thus, increasing component life and increasing power and efficiencies of the engine.

18 Claims, 4 Drawing Sheets

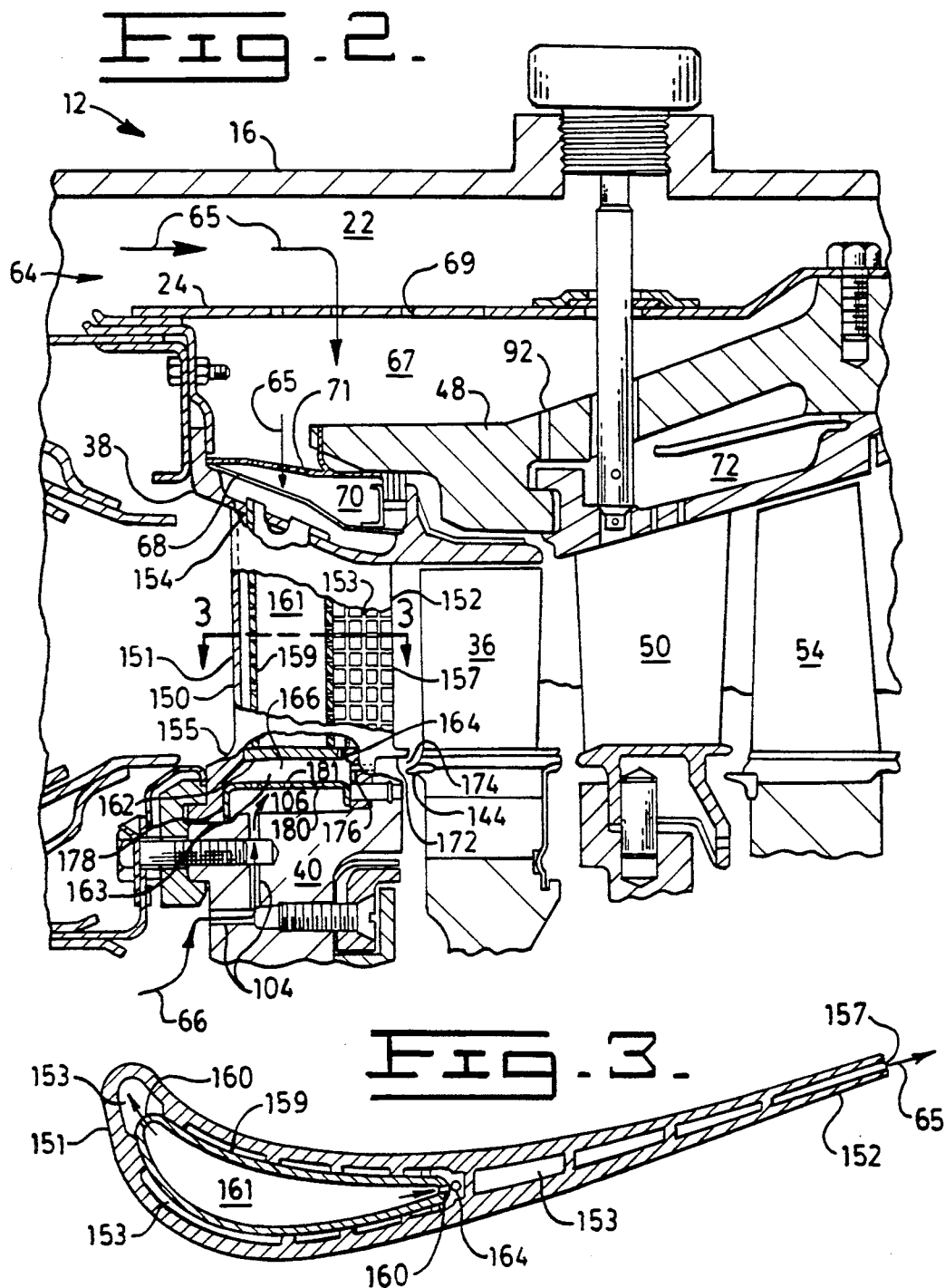

TURBINE COOLING SYSTEM

TECHNICAL FIELD

This invention relates generally to gas turbine engine cooling and more particularly to the cooling of the nozzle and shroud assembly and rotor wherein a portion of the cooling air after passing through the nozzle and shroud assembly is combined with additional cooling air to further improve turbine rotor cooling.

BACKGROUND ART

High performance gas turbine engines require cooling passages and cooling flows to ensure reliability and cycle life of individual components within the engine. For example, to improve fuel economy characteristics engines are being operated at higher temperatures than the material physical property limits of which the engine components are constructed. These higher temperatures, if not compensated for, erode engine components and decrease component life. Cooling passages are used to direct a flow of air to such engine components to reduce the high temperature of the components and prolong component life by limiting the temperature to a level which is consistent with material properties of such components.

Conventionally, a portion of the compressed air is bled from the engine compressor section to cool these components. Thus, the amount of air bled from the compressor section is usually limited to insure that the main portion of the air remains for engine combustion to perform useful work.

As the operating temperatures of engines are increased, to increase efficiency and power, either more cooling of critical components or better utilization of the cooling air is required.

Various arrangements for using cooling air to increase cycle life and reliability are available. U.S. Pat. No. 4,173,120 issued to William C. Grosjean et al on Nov. 6, 1979 discloses a cooling flow system. The system includes an air cooled nozzle and shroud assembly having a leading and trailing edge. An inner air reservoir is interconnected to a plurality of air flow passages which connects the reservoir with the leading edge and trailing edge internal plenum. The cooling air flows into the inner air reservoir and a portion of the cooling air internally impinges the leading edge through the plurality of passages near the leading edge and a portion of the cooling air exits along the trailing edge of the nozzle. Another portion of the cooling air from the reservoir exits the bottom portion of the nozzle below the turbine rotor blades and is further used as a buffer protecting the stator diaphragm from hot gas ingestion.

Another arrangement of using cooling air to increase cycle life and reliability is disclosed in U.S. Pat. No. 4,668,162 issued to Philip J. Cederwall et al on May 26, 1987. In this patent a cooling system includes a nozzle and shroud assembly having a plurality of through passages for transferring cooling air through the nozzle and a separate passage providing nozzle inner shroud cooling. From a reservoir below the nozzle a plurality of passages are provided for the cooling air to exit into an area below the turbine blades for buffering the hot power gas from reaching the rotor.

DISCLOSURE OF THE INVENTION

In one aspect of the present invention, a cooling air delivery system for cooling components of a gas turbine engine having a turbine, a compressor section and a compressor discharge plenum fluidly connecting the air delivery system to the compressor section is disclosed. The cooling air delivery system is comprised of a fluid flow path interconnecting the compressor discharge plenum with the engine components to be cooled. The fluid flow path has a cooling fluid flowing therethrough when the compressor section is in operation. The system further comprises a plurality of nozzle and shroud assemblies. Each of the plurality of nozzle and shroud assemblies includes a plurality of individual nozzle and shroud members. Each of the plurality of individual nozzle and shroud members includes an outer and inner shroud portion. The outer shroud portion has as inlet passage therein and includes a nozzle vane portion having a nozzle plenum therein. The outer shroud portion has an inlet passage therein and the passage and the nozzle plenum are in fluid communication with each other. The inner shroud portion further including a cooling chamber therein being positioned generally radially inward of the nozzle plenum. A partition is interposed between the cooling chamber and the nozzle plenum. The partition defines a second exit passage therein. The cooling chamber in each nozzle and shroud member forms a generally annular reservoir when assembled in operating relationship and is in fluid communication with the nozzle plenum. The annular reservoir has a plurality of directing passages exiting therefrom. Each of the nozzle and shroud members further includes a cantilevered flange being positioned radially external of the annular reservoir. The flanges extend axially from the inner shroud portion toward the turbine and form a radial shroud flange arrangement of cantilevered nozzle and shroud flanges when assembled in operating relationship to each other. The system further comprises a rotor assembly including a rotor. The rotor has a plurality of replaceable blades mounted therein. Each of the plurality of replaceable blades including a platform section, a lip and a cantilevered flange extending axially from the platform section on the side opposite the lip. The cantilevered flanges when aligned in their functionally assembled position establishing a radial blade flange arrangement of cantilevered turbine blade flanges. The radial blade flange arrangement of the cantilevered turbine blade flanges and the radial shroud flange arrangement of the cantilevered nozzle and shroud flanges axially overlapping each other in a preestablished radially spaced proximity forming a buffering zone therebetween. The plurality of directing passages from the annular reservoir are substantially radially aligned with the buffering zone.

In another aspect of the invention, a gas turbine engine including a cooling air delivery system for cooling components of the gas turbine engine, a turbine, a compressor section and a compressor discharge plenum fluidly connecting the air delivery system to the compressor section is disclosed. The gas turbine engine is comprised of a fluid flow path interconnecting the compressor discharge plenum with the engine components to be cooled. The fluid flow path has a cooling fluid flowing therethrough when the compressor section is in operation. The system further comprises a plurality of nozzle and shroud assemblies. Each of the plurality of nozzle and shroud assemblies includes a plurality of individual nozzle and shroud members. Each of the plurality of individual nozzle and shroud members includes an outer and inner shroud portion and a nozzle vane portion having a nozzle plenum therein. The outer shroud portion has an inlet passage therein. The inlet passage and the nozzle plenum are in fluid communication with each other. The inner shroud portion further including a cooling chamber being positioned generally radially inward of the nozzle plenum. A partition is interposed between the cooling chamber and the nozzle plenum. The partition defines a second exit passage therein. The cooling chamber in each of the nozzle and shroud members form a generally annular reservoir when assembled in operating relationship and are in fluid communication with the nozzle plenum. The annular reservoir has a plurality of directing passages exiting therefrom. The nozzle and shroud members further including a cantilevered flange being positioned radially external of the annular reservoir. The flanges extend axially from the inner shroud portion toward the turbine and form a radial shroud flange arrangement of cantilevered nozzle and shroud flanges. The system is further comprised of a rotor assembly including a rotor. The rotor has a plurality of replaceable blades mounted therein. Each of the plurality of replaceable blades including a platform section, a lip and a cantilevered flange extending axially from the platform section on the side opposite the lip. The cantilevered flanges when aligned in their functionally assembled position establishing a radial blade flange arrangement of cantilevered turbine blade flanges. The radial blade flange arrangement of the cantilevered turbine blade flanges and the radial shroud flange arrangement of the cantilevered nozzle and shroud flanges axially overlapping each other in a preestablished radially spaced proximity forming a buffering zone therebetween. The plurality of directing passages from the annular reservoir are substantially radially aligned with the buffering zone.

In another embodiment of the invention, a cooling air delivery system for cooling components of a gas turbine engine having a turbine, a compressor section and a compressor discharge plenum fluidly connecting the air delivery system to the compressor section is disclosed. The system is comprised of a fluid flow path interconnecting the compressor discharge plenum with the engine components to be cooled. The fluid flow path has a cooling fluid flowing therethrough when the compressor section is in operation. The system is further comprised of a plurality of nozzle and shroud assemblies. Each of the plurality of nozzle and shroud assemblies includes a plurality of individual nozzle and shroud members. Each of the plurality of individual nozzle and shroud members includes an outer and inner shroud portion and a nozzle vane portion having a nozzle plenum therein. The outer shroud portion has a inlet passage therein. The nozzle plenum has an insert therein defining a fluid passage therein. The insert has a plurality of bled passages therein. The inlet passage the fluid passage and the nozzle plenum are in fluid communication with each other. The inner shroud portion further includes a cooling chamber positioned generally radially inward of the fluid passage. A partition is interposed between the cooling chamber and the fluid passage. The partition defines a second exit passage therein. The first exit passage is in fluid communication with the nozzle plenum and the cooling chamber. The cooling chamber and each of the nozzle and shroud members form a generally annular reservoir when assembled in operating relationship. The annular reservoir has a plurality of directing passages exiting therefrom. Each of the nozzle and shroud members further including a cantilevered flange positioned radially external of the annular reservoir. The flanges extend axially from the inner shroud portion toward the turbine and form a radial shroud flange arrangement of cantilevered nozzle and shroud flanges when assembled in operating relationship to each other. The system is further comprised of a rotor assembly including a rotor. The rotor has a plurality of replaceable blades mounted therein. Each of the plurality of replaceable blades includes a platform section, a lip and a cantilevered flange extending axially from the platform section on the side opposite the lip. The cantilevered flanges when aligned in their functionally assembled position establishing a radial blade flange arrangement of cantilevered turbine blade flanges. The radial blade flange arrangement of the cantilevered turbine blade flanges and the radial shroud flange arrangement of the cantilevered nozzle and shroud flanges axially overlapping each other in a preestablished radially spaced proximity forming a buffering zone therebetween. The plurality of directing passages from the annular reservoir are substantially aligned with the buffering zone.

In both embodiments the cooling air delivery system for cooling components of gas turbine engines provides a more efficient cooling system. The increased flow of cooling air through the nozzle and shroud assembly increases the dissipation of heat from the nozzle. Furthermore, the formation of the buffering zone by the radial blade flange arrangement and the radial shroud flange arrangement and the location the plurality of directing passages exiting the annular reservoir into the buffering zone resists the ingestion of hot power gases into the internal components of gas turbine engine.

BRIEF DESCRIPTION OF THE DRAWINGS

FIG. 2 is an enlarged sectional view of a portion of FIG. 1 taken along lines 2—2 embodying the present invention;

FIG. 3 is an enlarged sectional view taken through a nozzle portion along lines 3—3 of FIG. 2;

BEST MODE FOR CARRYING OUT THE INVENTION

Figure 1:
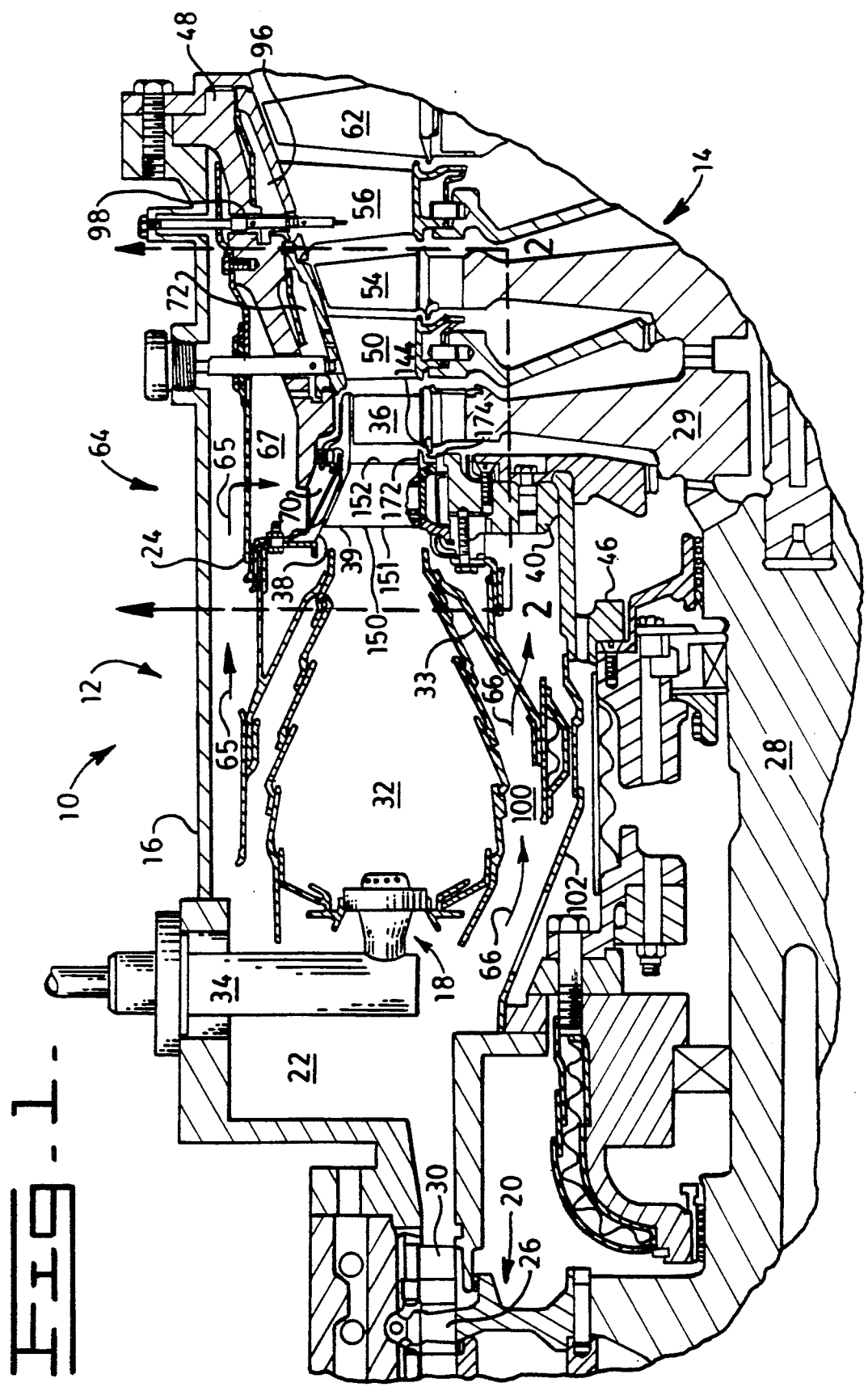
FIG. 1 is a sectional side view of a portion of a gas turbine engine embodying the present invention.

Referring to FIG. 1, a gas turbine engine 10, not shown in its entirety, has been sectioned to show a cooling air delivery system 12 for cooling components of a turbine section 14 of the engine. The engine 10 includes an outer case 16, a combustor section 18, a compressor section 20, and a compressor discharge plenum 22 fluidly connecting the air delivery system 12 to the compressor section 20. The plenum 22 is partially defined by the outer case 16 and a multipiece inner wall 24 partially surrounding the turbine section 14 and the combustor section 18. The compressor section 20 includes a plurality of rotatable blades 26 attached to a longitudinally extending center shaft 28 driven by a gasifier turbine section 29. A plurality of compressor stator blades 30 extend from the outer case 16 and are positioned axially between rotatable blades rows. The compressor section 20 is a multistage axial compressor although only a single stage is shown. The combustor section 18 includes a plurality of combustion chambers 32 supported within the plenum 22 by a plurality of supports 33, only one shown. A plurality of fuel nozzles 34 (one shown) are positioned in the plenum 22 at the end of the combustion chamber 32 near the compressor section 20. The turbine section 14 includes a first stage turbine 36 disposed partially within an integral first stage nozzle and shroud assembly 38. The assembly 38 includes a plurality of individual nozzle and shroud members 39 and is supported from the center shaft 28 by a series of thermally varied masses 40 which are assembled to prevent rapid thermal variation during heating and cooling of such masses 40. The masses 40 are attached to a bearing housing arrangement 46. A nozzle support case 48 is disposed within the outer case 16 and attached to the case 16 by a plurality of bolts and dowels, not shown. An integral second stage nozzle and shroud assembly 50 is attached to the nozzle support case 48 in a conventional manner and a second stage turbine 54 is disposed partially within the assembly 50. An integral third stage nozzle and shroud assembly 56 is also attached to the nozzle support case 48 by a conventional manner and a third stage turbine 62 is disposed partially within the assembly 56.

As more clearly shown in FIG. 2, the cooling air delivery system has a fluid flow path 64 interconnecting the compressor discharge plenum 22 with the turbine section 14 and is divided into a first and second flow of cooling fluid, designated by the arrows 65 and 66 respectively. During operation, a fluid flow is available in the fluid flow path 64. A first annular portion 67 of the fluid flow path 64 is disposed between the integral first stage nozzle and shroud assembly 38 and the multipiece inner wall 24. A multipiece shroud plate 68 is positioned in contacting relationship between a portion of the assembly 38 and the nozzle support case 48. A plurality of passages 69 in the inner wall 24 provide communication of the cooling air from the compressor discharge plenum 22 to the first annular portion 67. A second annular portion 70 of the fluid flow path 64 is disposed between the integral first stage nozzle and shroud assembly 38 and the multipiece shroud plate 68. A plurality of passages 71 in the multipiece shroud plate 68 connect the second annular portion 70 with the first annular portion 67. A third annular portion 72 is disposed between the nozzle support case 48 and the second stage nozzle assembly 50. A plurality of second fluid flow control passages 92, only one shown, are located in the nozzle support case 48 and connects the third annular portion 72 of the fluid flow path 64 with the first annular portion 67. A forth annular portion 96 of the fluid flow path 64 is disposed between the integral third stage nozzle and shroud assembly 56 and the nozzle support case 48. A plurality of cooling passages 98, only one shown, are disposed in the nozzle support case 48. The plurality of cooling passages 98 interconnect the discharge plenum 22 with the forth annular portion 96.

The fluid flow path 64 further includes a plurality of internal passages 100, only one shown, within the engine 10 through which the second flow of cooling fluid 66 is directed therethrough. For example, the internal passages 100 are intermediate a flexible wall 102 positioned between portions of the bearing housing 46 and the combustion chamber support 33. Each of the combustion chambers 32 are radially disposed in spaced apart relationship within the plenum 22 and has clearance therebetween for the second flow of cooling fluid 66 to pass therethrough. The flow path 64 for the second flow of cooling fluid further includes a plurality of passages 104, only one shown, in the varied masses 40. The plurality of passages 104 interconnect the internal passages 100 with an annular cooling supply chamber 106 positioned external of the varied masses 46.

Figure 4:
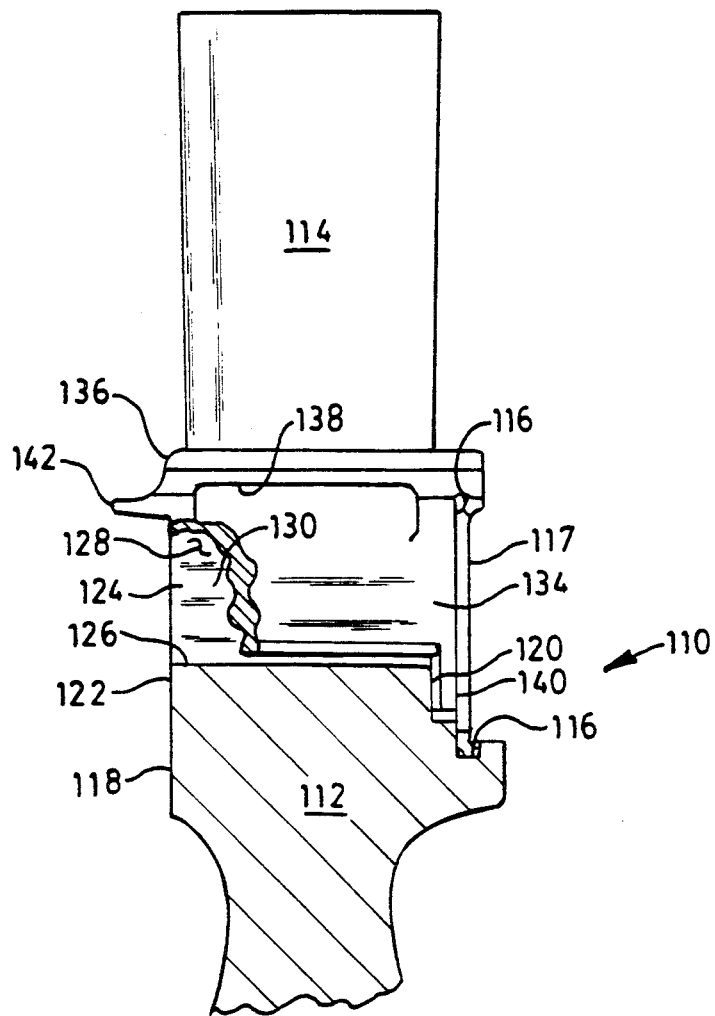
FIG. 4 is an enlarged partially sectioned view of the joint attaching a turbine blade to a turbine rotor.

As best shown in FIG. 2 and 4, the first, second and third stage turbines 36,54,62 of the turbine section 14 are of a generally conventional design. For example, the first stage turbine 36 includes a rotor assembly 110 disposed axially adjacent the nozzle and shroud assembly 38 which is comprised of a rotor 112, a plurality of blades 114, an annular T-slot 116 on each of the rotor 112 and the blades 114, an opening, not shown, on the rotor 112 to provide access to a portion of the T-slot and a plurality of sealing members 117, one of which is shown. The rotor 112 further includes a rim 118 at its perimeter, a first face 120 and a second face 122. The first face 120 is stepped or multileveled. A plurality of circumferentially arrayed retention slots 124 are positioned in the rim 118. Each of the slots 124 extends from one face 120 to the other face 122, has a bottom 126 and has a pair of side walls 128, only one of which is shown, which are undercut in a conventional manner to provide at least one inwardly directed abutment face 130 on each side wall 128. The plurality of blades 114 are replaceably mounted within the rim 118. Each of the plurality of blades 114 includes a root section 134 which engages a corresponding slot 124 and is spaced away from the bottom 126 of the slot 124 in the rotor 112. Each blade has a platform section 136 disposed radially outwardly from the periphery of the rim 118 by an extended neck region 138 of the blade 114. Each blade has a lip 140 projecting radially inward from the root section and abuts a portion of the multileveled surface of the first face 120. Each blade further includes a cantilevered flange 142 extending axially from the platform section 136 on the side adjacent the nozzle and shroud assembly 38 which is also the side opposite the lip 140. Each of the cantilevered flanges 142 when aligned in their functionally assembled position establish a radial blade flange arrangement 144 of cantilevered turbine blade flanges having a preestablished radius or diameter.

Figure 5:
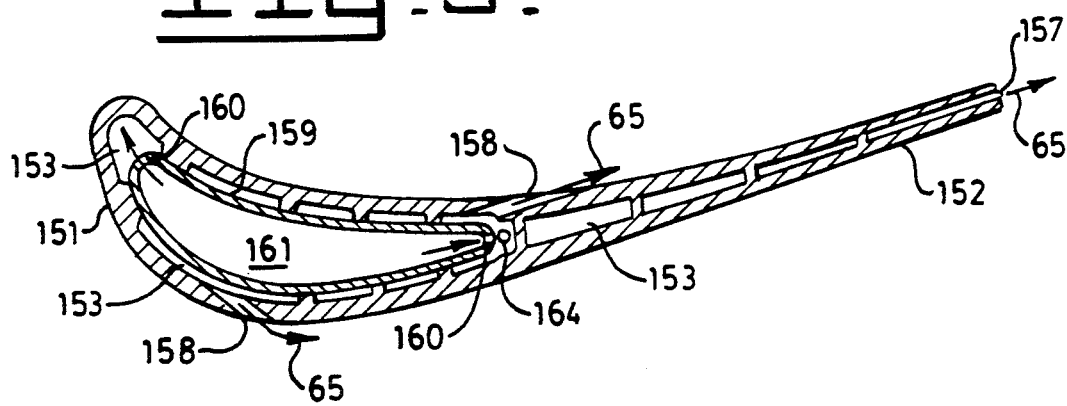
FIG. 5 is an enlarged sectional view of an alternate nozzle portion embodiment of the present invention.
Figure 6:
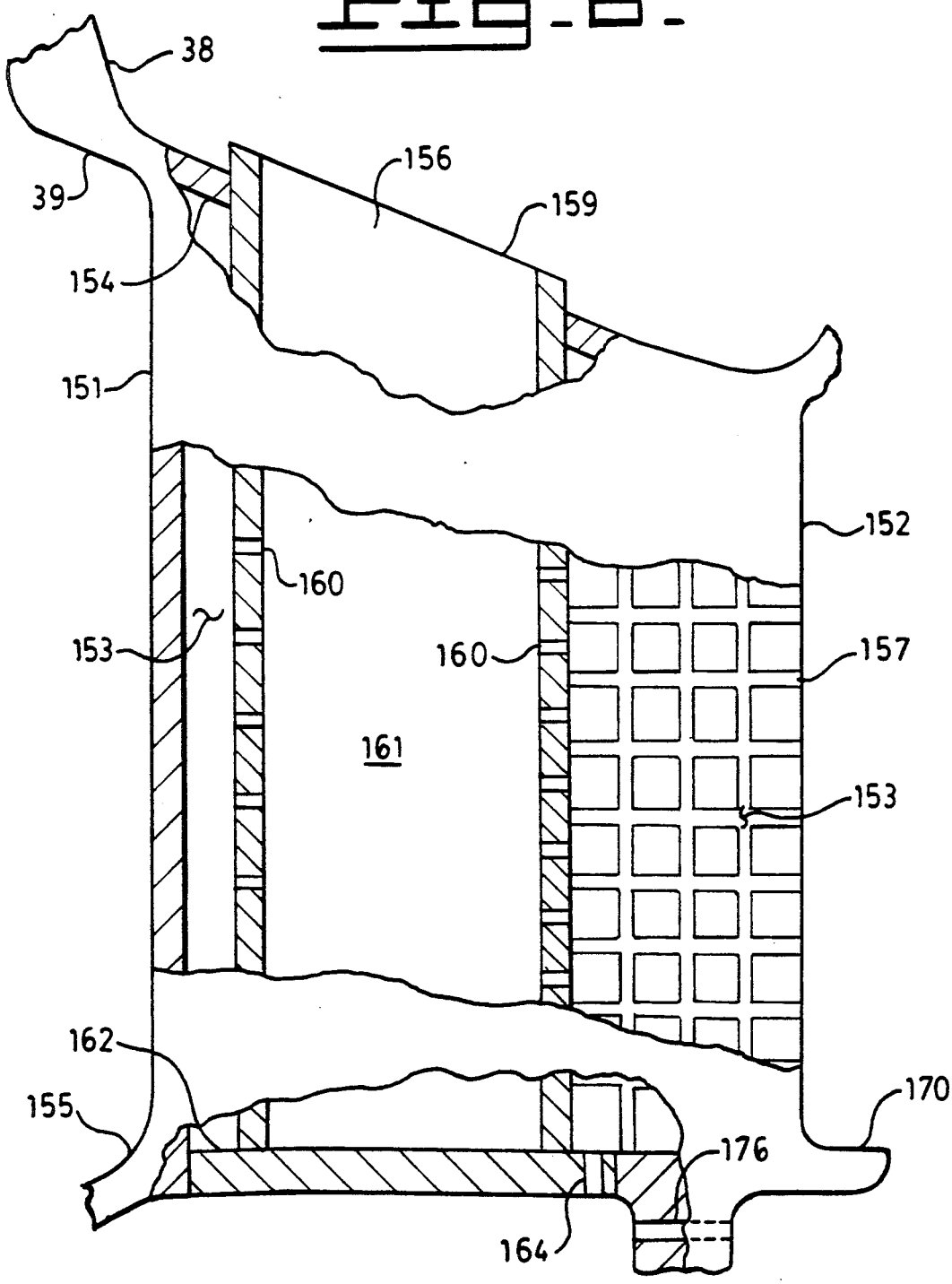
FIG. 6 is an enlarged partially sectioned view of a nozzle vane portion.

As is more clearly shown in FIG. 1, 2, 3 and 6, each of the plurality of nozzle and shroud members 39 of the first stage nozzle and shroud assembly 38 includes a pair of nozzle vane portions 150, of which only one is shown. Each of the nozzle vane portions 150 have a leading edge 151, a trailing edges 152, a nozzle plenum 153 therein, an outer shroud portion 154 and an inner shroud portion 155. Each of the nozzle vane portions 150 are hollow resulting in the formation of the nozzle plenum 153. Each of the outer shroud portions 154 have an inlet passage 156 therein. Each of the plurality of nozzle and shroud members 39 further includes a plurality of first exit passages 157 disposed in the trailing edge 152. As an alternative shown in FIG. 5, the nozzle vane portion 150 could include a plurality of openings 158 in the nozzle vane portion 150 near the leading edge to allow a portion of the cooling air to exit therethrough and be utilized for film cooling of the nozzle vane portion 150. An insert 159 extends longitudinally through the nozzle vane portion 150 and a portion of the nozzle plenum 153 spanning approximately the leading one half of the nozzle vane portion. The insert 159, when assembled in working relationship, includes a plurality of bleed passages 160 positioned near the leading and trailing edges of the nozzle vane portion 150 through which the entire flow of the first flow 65 exits therethrough. The insert 159 further extends into the passage 156 of the outer shroud portions 154 providing a fluid passage 161 which communicates with the second annular portion 70. The other end of the insert 159 is in sealing contact with a partition 162 interposed between the insert 159 and a cooling chamber 163 positioned generally radially inward of the nozzle plenum 153. A second exit passage 164 is defined in the partition 162 and has a preestablished area for controlling the flow rate of the first flow 65 of cooling fluid into the cooling chamber 163. The second exit passage 164 interconnecting the cooling chamber 163 with the nozzle plenum 153. When the nozzle and shroud members 39 are functionally assembled in operating relationship the cooling chamber 163 combine to form a generally annular reservoir 166. The annular reservoir 166 is in fluid communication with the nozzle plenum 153 of each of the nozzle vane portions 150 through use of the second exit passage 164. A cantilevered flange 170 is positioned radially external of the annular reservoir 166 and extends from the inner shroud portion 154 toward the turbine 36. Each of the cantilevered flanges 170 when aligned in their functionally assembled position establish a radial shroud flange arrangement 172 of cantilevered nozzle and shroud flanges having a preestablished radius or diameter. In this application, the preestablished radius of the radial shroud flange arrangement 172 of the cantilevered nozzle and shroud flanges is larger than the preestablished radius of the radial blade flange arrangement 144 of the cantilevered turbine blade flanges. The radial shroud flange arrangement 172 and the radial blade flange arrangement 144 axially overlap each other in a preestablished radially spaced proximity forming a buffering passage or zone 174 therebetween. A plurality of directing passages 176, one shown, exit the annular reservoir 166 and are substantially functionally aligned intermediate the radial shroud flange arrangement 172 and the radial blade flange arrangement 144. An additional plate 178 is attached internally of the annular reservoir 166 and to the inner shroud portion 155 of the nozzle and shroud members 39. The plate 178 has a second passage means 180 defined therein and the second passage means 180 includes a plurality of second cooling passages 181 defined therein which are in fluid communication with the annular cooling supply chamber 106. Each of the plurality of second cooling passages 181 has a preestablished area for controlling the flow rate of the second flow 65 of cooling fluid. The above description is of only the first stage nozzle and shroud assembly 38; however, it should be known that the construction is generally typical of the remainder of the nozzle and shroud assemblies 50 and 56.

INDUSTRIAL APPLICABILITY

In operation, the cooling fluid or air from the compressor section 20 as used in the delivery system 12 increases the efficiency and power of the gas turbine engine 10 while increasing the longevity of the components used within the gas turbine engine 10. The following operation will be directed to the first stage nozzle and shroud assembly; however, the cooling operation of the remainder of the nozzle and shroud assemblies is very similar. A portion of the compressed air from the compressor section 20 is bled therefrom forming the first flow of cooling fluid 65 used to cool the nozzle and shroud assembly 38. The air exits from the compressor section 20 into the compressor discharge plenum 22 and enters into a portion of the fluid flow path 64. Thus, the first flow of cooling air designated by the arrows 65 enters into the first annular portion 67 through a plurality of passages 69 in the multipiece inner wall 24. From the first annular portion 67, air flows through the plurality of passages 71, enters into the second annular portion 70 and is distributed into the flow passage 161 of each nozzle vane portion 150. The cooling air is then distributed through the plurality of openings 160 in the insert 159 into the nozzle plenum 153 and is directed toward the leading and trailing edges 151,152 of the nozzle vane portion 150. The cooling air exiting the plurality of openings 160 facing the leading edge 151 follows around the hollow interior of the nozzle vane portion 150 near the leading edge toward the trailing edge 152 absorbing heat from the nozzle vane portion 150 to reduce the temperature thereof and increase the longevity of the nozzle vane portion 150. The cooling air exiting the plurality of openings 160 into the nozzle plenum 153 near the trailing edge 152 is mixed with the hotter air which has exited the plurality of openings 160 near the leading edge 151 and has absorbed heat while traveling around the hollow interior of the nozzle vane portion 150. Thus, the combined cooling air further removes heat from the nozzle vane portion 150 and a portion of the combined cooling air exits the plurality of first exit passages 157 in the trailing edge 151 of the nozzle vane portion 150. The remainder of the combined cooling air exits the second exit passage 164 and enters into the annular reservoir 166. The preestablished area of the second exit passage 164 establishes the amount of combined cooling air exiting the plurality of first exit passages 157 in the trailing edge 151 and the amount of combined cooling air entering the annular reservoir 166. In this application, the ratio of cooling air flow exiting the plurality of first exit passages 157 in the trailing edge 151 to that entering the annular cooling reservoir 166 is approximately 4 to 1. Thus, to increase the cooling air flow primarily to improve nozzle leading edge 151 cooling effectiveness the area of the second exit passage 164 can be increased or decreased depending on the flow desired.

Another portion of the compressed air from the compressor section 20 is bleed therefrom forming the second flow of cooling air designated by the arrows 66 used to cool and prevent ingestion of the hot power gases into the internal components of the gas turbine engine 10. For example, the air bled from the compressor section 20 flows into the compressor discharge plenum 22, through the internal passages 100 or areas between the plurality of combustion chambers 32 and into the plurality of passages 104 in the varied masses 40. After passing through the plurality of passages 104 in the masses 40, the cooling air enters into the annular cooling supply chamber 106 and is communicated through the plurality of second cooling passages 181 into the annular reservoir 166. Within the annular reservoir 166 the combined cooling air from the first and second flow 65,66 of cooling fluid can mix or may exit the plurality of directing passages independently. The cooling air within the annular reservoir 166 exits the plurality of directing passages 176 and is exhausted directly into the buffering zone 174. The preestablished area of each of the plurality of second cooling passage 181 establishes the amount of cooling air from the second flow of cooling air to be mixed in the annular reservoir and further controls the cooling flow in the nozzle vane portion.

Thus, the primary advantages of the improved turbine cooling system provide a more efficient use of the cooling air bled from the compressor section 20, increase the component life and efficiency of the engine and insure that the main portion of the compressed air remains for engine combustion. The first flow 65 of cooling air increases the cooling air flow through the nozzle vane portion 150 and improves nozzle leading edge cooling efficiency. Furthermore, the radial shroud flange arrangement 172 and the radial blade flange arrangement 144 which are axially overlapping each other in a preestablished radially spaced proximity forming the buffering zone 174 provide a resistance to the ingestion of hot power gases into the internal components of the gas turbine engine 10. The mixing of the first and second flows 65,66 in the annular reservoir 166 and the exhausting of the air through the plurality of directing passages 176 which are substantially radially aligned with the buffering zone into the buffer zone further insures that the ingestion of hot power gases into the internal components of the gas turbine engine 10 is decreased.

Other aspects, objects and advantages of this invention can be obtained from a study of the drawings, the disclosure and the appended claims.

We claim:

1. A gas turbine engine including a cooling air delivery system for cooling components of the gas turbine engine, a turbine, a compressor section and a compressor discharge plenum fluidly connecting the air delivery system to the compressor section comprising:

a fluid flow path interconnecting the compressor discharge plenum with the engine components to be cooled and having a cooling fluid flowing therethrough when the compressor section is in operation;

a nozzle and shroud assembly, said nozzle and shroud assembly including a plurality of individual nozzle and shroud members, each of said plurality of individual nozzle and shroud members including an outer and inner shroud portion and a nozzle vane portion having a nozzle plenum therein, said outer shroud portion having an inlet passage therein, said passage and said nozzle plenum being in fluid communication with each other, said inner shroud portion further including a cooling chamber therein being positioned generally radially inward of the nozzle plenum, a partition being interposed between the cooling chamber and the nozzle plenum, said partition defining a second exit passage therein, said cooling chamber in each of the nozzle and shroud members forming a generally annular reservoir when assembled in operating relationship and being in fluid communication through the second exit passage with the nozzle plenum, said annular reservoir having a plurality of directing passages exiting therefrom, each of the nozzle and shroud members further including a cantilevered flange being positioned radially external of the annular reservoir, said flanges extending axially from the inner shroud portion toward the turbine and forming a radial shroud flange arrangement of cantilevered nozzle and shroud flanges when assembled in operating relationship to each other;

a rotor assembly disposed axially adjacent the nozzle and shroud assembly, said rotor assembly including a rotor having a plurality of replaceable blades mounted thereon, each of the plurality of replaceable blades including a platform section, a cantilevered flange extending axially from the platform section on the side adjacent the nozzle and shroud assembly, said cantilevered flanges when aligned in their functionally assembled position establishing a radial blade flange arrangement of cantilevered turbine blade flanges;

said radial blade flange arrangement and said radial shroud flange arrangement axially overlapping each other in a preestablished radially spaced proximity forming a buffering zone therebetween, and said plurality of directing passages from the annular reservoir being substantially radially aligned with the buffering zone; and a second passage means entering into the annular reservoir and wherein said fluid flow path has a first flow of cooling fluid from the compressor section being directed through the nozzle and shroud assembly into the annular reservoir before exiting the plurality of directing passages from the annular reservoir into the buffering zone and a second flow of cooling fluid from the compressor being directed through a plurality of internal passages in the engine through the second passage means into the annular reservoir before exiting the plurality of directing passages from the annular reservoir into the buffering zone, and said second exit passage having a preestablished area for controlling the flow rate of the first flow of cooling fluid into the annular reservoir.

2. The gas turbine engine of claim, 1 wherein the second passage means includes a plurality of passages in the partition and each of said plurality of passages has a preestablished area for controlling the flow rate of the second flow of cooling fluid into the annular reservoir.

3. The gas turbine engine of claim 1 wherein each of said nozzle vane portions further includes a leading and trailing edge and a plurality of first exit passages exiting the nozzle plenum, said plurality of first exit passages being defined in the trailing edge thereof.

4. The gas turbine engine of claim 1 wherein each of said nozzle vane portions further includes a leading and trailing edge, a plurality of openings in the nozzle vane portion being defined near the leading edge and a plurality of first exit passages being defined in the trailing edge thereof.

5. The gas turbine engine of claim 3 wherein said fluid flow path has a first flow of cooling fluid from the compressor section being directed through the nozzle and shroud assembly to the annular reservoir and exits into the buffering zone, a portion of the first flow of cooling fluid from the compressor section being directed into the nozzle plenum and exiting through the plurality of first exit passages defined in the trailing edge, and another portion of the first flow of cooling fluid from the compressor section being directed through the nozzle plenum to the annular reservoir and exiting into the buffering zone.

6. The gas turbine engine of claim 4 wherein a portion of the first flow of cooling fluid in the fluid flow path is directed into the nozzle plenum and exits through the plurality of openings in the nozzle vane portion defined near the leading edge and the plurality of first exit passages defined in the trailing edge, and another portion of the first flow of cooling fluid from the compressor section is directed through the nozzle and shroud assembly to the annular reservoir and through the directing passages into the buffering zone.

7. A cooling air delivery system for cooling components of a gas turbine engine having a turbine, a compressor section and a compressor discharge plenum fluidly connecting the air delivery system to the compressor section comprising:
  a fluid flow path interconnecting the compressor discharge plenum with the engine components to be cooled and having a cooling fluid flowing therethrough when the compressor section is in operation;
  a nozzle and shroud assembly, said nozzle and shroud assembly including a plurality of individual nozzle and shroud members, each of said plurality of individual nozzle and shroud members including an outer and inner shroud portion and a nozzle vane portion having a nozzle plenum therein, said outer shroud portion having an inlet passage therein, said passage and said nozzle plenum being in fluid communication with each other, said inner shroud portion further including a cooling chamber therein being positioned generally radially inward of the nozzle plenum, a partition being interposed between the cooling chamber and the nozzle plenum, said partition defining a second exit passage therein, said cooling chamber in each of the nozzle and shroud members forming a generally annular reservoir when assembled in operating relationship and being in fluid communication through the second exit passage with the nozzle plenum, said annular reservoir having a plurality of directing passages exiting therefrom, each of the nozzle and shroud members further including a cantilevered flange being positioned radially external of the annular reservoir, said flanges extending axially from the inner shroud portion toward the turbine and forming a radial shroud flange arrangement of cantilevered nozzle and shroud flanges when assembled in operating relationship to each other;
  a rotor assembly disposed axially adjacent the nozzle and shroud assembly, said rotor assembly including a rotor having a plurality of replaceable blades mounted thereon, each of the plurality of replaceable blades including a platform section, a cantilevered flange extending axially from the platform section on the side adjacent the nozzle and shroud assembly, said cantilevered flanges when aligned in their functionally assembled position establishing a radial blade flange arrangement of cantilevered turbine blade flanges;
  said radial blade flange arrangement and said radial shroud flange arrangement axially overlapping each other in a preestablished radially spaced proximity forming a buffering zone therebetween, and said plurality of directing passages from the annular reservoir being substantially radially aligned with the buffering zone; and
  a second passage means entering into the annular reservoir and wherein said fluid flow path has a first flow of cooling fluid from the compressor section being directed through the nozzle and shroud assembly into the annular reservoir before exiting the plurality of directing passages from the annular reservoir into the buffering zone and a second flow of cooling fluid from the compressor being directed through a plurality of internal passages in the engine through the second passage means into the annular reservoir before exiting the plurality of directing passages from the annular reservoir into the buffering zone, and said second exit passage having a preestablished area for controlling the flow rate of the first flow of cooling fluid into the annular reservoir.

8. The cooling air delivery system of claim 7 wherein said cooling air delivery system further includes a plate attached internally to the nozzle and shroud member, the second passage means includes a plurality of passages in the plate and each of said plurality of passages has a preestablished area for controlling the flow rate of the second flow of cooling fluid into the annular reservoir.

9. The cooling air delivery system of claim 7 wherein each of said nozzle vane portions further includes a leading and trailing edge and a plurality of first exit passages exiting the nozzle plenum, said plurality of first exit passages being defined in the trailing edge thereof.

10. The cooling air delivery system of claim 7 wherein each of said nozzle vane portions further includes a leading and trailing edge, a plurality of openings in the nozzle vane portion being defined near the leading edge through which a portion of the first flow exits the nozzle plenum and a plurality of first exit passages being defined in the trailing edge thereof.

11. The cooling air delivery system of claim 9 wherein said fluid flow path has a first flow of cooling fluid from the compressor section being directed through the nozzle and shroud assembly to the annular reservoir and exits into the buffering zone, a portion of the first flow of cooling fluid from the compressor section passing into the nozzle plenum and exiting through the plurality of first exit passages defined in the trailing edge, and another portion of the first flow of cooling fluid from the compressor section passing through the nozzle plenum to the annular reservoir and exiting into the buffering zone.

12. The cooling air delivery system of claim 10 wherein a portion of the first flow of cooling fluid in the fluid flow path is directed into the nozzle plenum and exits through the plurality of openings defined near the leading edge through which a portion of the first flow exits from the nozzle plenum and the plurality of first exit passages defined in the trailing edge, and another portion of the first flow of cooling fluid from the compressor section is directed through the nozzle plenum to the annular reservoir and through the directing passages into the buffering zone.

13. A cooling air delivery system for cooling components of a gas turbine engine having a turbine, a compressor section and a compressor discharge plenum fluidly connecting the air delivery system to the compressor section comprising:
  a fluid flow path interconnecting the compressor discharge plenum with the engine components to be cooled and having a cooling fluid flowing therethrough when the compressor section is in operation;
  a nozzle and shroud assembly, said nozzle and shroud assembly including a plurality of individual nozzle and shroud members, each of said plurality of individual nozzle and shroud members including an outer and inner shroud portion and a nozzle vane portion having a nozzle plenum therein, said outer shroud portion having an inlet passage therein, said nozzle plenum having an insert therein defining a fluid passage therein, said insert having a plurality of bleed passages therein communicating between the fluid passage and the nozzle plenum, said inlet passage, said fluid passage and said nozzle plenum being in fluid communication with each other, said inner shroud portion further including a cooling chamber being positioned generally radially inward of the nozzle plenum, a partition being interposed between the cooling chamber and the nozzle plenum, said partition defining a first exit passage therein, said first exit passage being in fluid communication through a second exit passage with the nozzle plenum and the cooling chamber, said cooling chamber and each of the nozzle and shroud members forming a generally annular reservoir when assembled in operating relationship, said annular reservoir having a plurality of directing passages exiting therefrom, each of the nozzle and shroud members further including a cantilevered flange being positioned radially external of the annular reservoir, said flanges extending axially from the inner shroud portion toward the turbine and forming a radial shroud flange arrangement of cantilevered nozzle and shroud flanges when assembled in operating relationship to each other;

a rotor assembly disposed axially adjacent the nozzle and shroud assembly, said rotor assembly including a rotor having a plurality of replaceable blades mounted thereon, each of the plurality of replaceable blades including a platform section, a cantilevered flange extending axially from the platform section on the side adjacent the nozzle and shroud assembly, said cantilevered flanges when aligned in their functionally assembled position establishing a radial blade flange arrangement of cantilevered turbine blade flanges;

said radial blade flange arrangement of the cantilevered turbine blade flanges and said radial shroud flange arrangement of the cantilevered nozzle and shroud flanges axially overlapping each other in a preestablished radially spaced proximity forming a buffering zone therebetween, and said plurality of directing passages from the annular reservoir being substantially aligned with the buffering zone; and a second passage means entering into the annular reservoir and wherein said fluid flow path has a first flow of cooling fluid from the compressor section being directed through the nozzle and shroud assembly into the annular reservoir before exiting the plurality of directing passages from the annular reservoir into the buffering zone and a second flow of cooling fluid from the compressor being directed through a plurality of internal passages in the engine through the second passage means into the annular reservoir before exiting the plurality of directing passages from the annular reservoir into the buffering zone, and said second exit passage having a preestablished area for controlling the flow rate of the first flow of cooling fluid into the annular reservoir.

14. The cooling air delivery system of claim 13 wherein said cooling air delivery system further includes a plate attached internally to the nozzle and shroud member, the second passage means includes a plurality of passages in the plate and each of said plurality of passages has a preestablished area for controlling the flow rate of the second flow of cooling fluid into the annular reservoir.

15. The cooling air delivery system of claim 13 wherein each of said nozzle vane portions further includes a leading and trailing edge and a plurality of first exit passages exiting the nozzle plenum, said plurality of first exit passages being defined in the trailing edge thereof.

16. The cooling air delivery system of claim 13 wherein each of said nozzle vane portions further includes a leading and trailing edge, a plurality of openings being defined near the leading edge and a plurality of first exit passages being defined in the trailing edge exiting the first fluid flow therethrough.

17. The cooling air delivery system of claim 15 wherein said fluid flow path has a first flow of cooling fluid from the compressor section being directed through the nozzle and shroud assembly to the annular reservoir and exits into the buffering zone, a portion of the first flow of cooling fluid from the compressor section passing into the nozzle plenum being directed through the plurality of first exit passages defined in the trailing edge, and another portion of the first flow of cooling fluid from the compressor section being directed through the nozzle plenum to the annular reservoir and exiting into the buffering zone.

18. The cooling air delivery system of claim 16 wherein a portion of the first flow of cooling fluid in the fluid flow path is directed into the nozzle vane portion and exits through the plurality of openings in the nozzle vane portion defined near the leading edge and the plurality of first exit passages defined in the trailing edge and another portion of the first flow of cooling fluid from the compressor section is directed through the nozzle and shroud assembly to the annular reservoir and through the directing passages into the buffering zone.

* * * * *